(12) United States Patent
Park et al.

(10) Patent No.: US 11,741,950 B2
(45) Date of Patent: Aug. 29, 2023

(54) METHOD AND APPARATUS WITH SPEECH PROCESSING

(71) Applicant: Samsung Electronics Co., Ltd., Suwon-si (KR)

(72) Inventors: Jeong-Hoon Park, Seoul (KR); Jihyun Lee, Suwon-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 15/931,949

(22) Filed: May 14, 2020

(65) Prior Publication Data

US 2021/0151042 A1  May 20, 2021

(30) Foreign Application Priority Data

Nov. 19, 2019  (KR) .......................... 10-2019-0148441

(51) Int. Cl.
   *G10L 15/197*  (2013.01)
   *G10L 15/02*  (2006.01)

(52) U.S. Cl.
   CPC ............ *G10L 15/197* (2013.01); *G10L 15/02* (2013.01); *G10L 2015/025* (2013.01)

(58) Field of Classification Search
   None
   See application file for complete search history.

(56) References Cited

U.S. PATENT DOCUMENTS

| | | | |
|---|---|---|---|
| 9,240,181 B2 | 1/2016 | Khare et al. | |
| 9,454,957 B1 | 9/2016 | Mathias et al. | |
| 9,852,728 B2 | 12/2017 | Singh et al. | |
| 10,839,159 B2 * | 11/2020 | Yang | ...................... G06N 5/022 |
| 10,854,192 B1 * | 12/2020 | Maas | ...................... G10L 15/05 |

(Continued)

FOREIGN PATENT DOCUMENTS

| | | | |
|---|---|---|---|
| CN | 109408824 A | * | 3/2019 |
| KR | 10-2011-0070057 A | | 6/2011 |

OTHER PUBLICATIONS

Geoffrey Zweig, Continuous Speech Recognition with a TF-IDF Acoustic Model, Microsoft, 2010, pp. 1-4 (Year: 2010).*

(Continued)

*Primary Examiner* — Jonathan C Kim
*Assistant Examiner* — Jonathan Ernesto Amaya Hernandez
(74) *Attorney, Agent, or Firm* — NSIP Law

(57) ABSTRACT

A processor-implemented method includes performing speech recognition of a speech signal, generating a plurality of first candidate sentences as a result of the performing of the speech recognition, identifying a respective named entity in each of the plurality of first candidate sentences, determining a standard expression corresponding to the identified respective named entity using phonemes of the corresponding named entity, determining whether to replace the identified named entity in each of the plurality of first candidate sentences with the determined standard expression based on a similarity between the named entity and the standard expression corresponding to the named entity and determining a plurality of second candidate sentences based on the determination result; and outputting a final sentence selected from the plurality of second candidate sentences.

20 Claims, 10 Drawing Sheets

(56) References Cited

U.S. PATENT DOCUMENTS

| | | | |
|---|---|---|---|
| 2008/0306908 A1 | 12/2008 | Agrawal et al. | |
| 2011/0224982 A1* | 9/2011 | Acero | G10L 15/08 |
| | | | 704/236 |
| 2014/0163964 A1 | 6/2014 | Chen et al. | |
| 2015/0058005 A1 | 2/2015 | Khare et al. | |
| 2015/0317301 A1 | 11/2015 | Liang et al. | |
| 2016/0275945 A1* | 9/2016 | Elisha | G06F 16/685 |
| 2016/0336008 A1 | 11/2016 | Menezes et al. | |
| 2016/0358596 A1* | 12/2016 | Singh | G10L 13/08 |
| 2017/0083505 A1 | 3/2017 | Whitman et al. | |
| 2017/0270188 A1 | 9/2017 | Jain et al. | |
| 2017/0287474 A1 | 10/2017 | Maergner et al. | |
| 2018/0068661 A1* | 3/2018 | Printz | G10L 15/16 |
| 2020/0372110 A1* | 11/2020 | Kaul | G06F 40/242 |
| 2021/0117624 A1* | 4/2021 | Aghajanyan | G06V 10/255 |

OTHER PUBLICATIONS

Extended European Search Report dated Feb. 5, 2021 in counterpart European Patent Application No. 20192206.9 (7 pages in English).

* cited by examiner

310 { G2P conversion

John Lennon → c0 oo ll rr ee nn oo nf
Colleen McCauley → kh oo ll rr ii nf mm qq kh oo ll rr ii 320 { Inverted index table

| Key | Value | |
| --- | --- | --- |
| c0 | John Lennon | |
| oo | John Lennon | Colleen McCauley |
| ll | John Lennon | Colleen McCauley |
| rr | John Lennon | Colleen McCauley |
| ee | John Lennon | |
| nn | John Lennon | |
| nf | John Lennon | Colleen McCauley |
| kh | Colleen McCauley | |
| ii | Colleen McCauley | |
| mm | Colleen McCauley | |
| qq | Colleen McCauley | |

FIG. 3

METHOD AND APPARATUS WITH SPEECH PROCESSING

CROSS-REFERENCE TO RELATED APPLICATIONS

This application claims the benefit under 35 USC § 119(a) of Korean Patent Application No. 10-2019-0148441 filed on Nov. 19, 2019 in the Korean Intellectual Property Office, the entire disclosure of which is incorporated herein by reference for all purposes.

BACKGROUND

1. Field

The following description relates to a method and apparatus with speech processing.

2. Description of Related Art

Speech recognition technology recognizes a speech of a user. Through the speech recognition, the speech or audio output of the user is converted into text. With developments in speech recognition technologies, there is an increasing desire for users to issue voice commands to devices.

However, optimal performance may not be guaranteed due to limited learning data of models that perform speech recognition, and the effects of ambient noise that may affect the speech signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes performing speech recognition of a speech signal, generating a plurality of first candidate sentences as a result of the performing of the speech recognition, identifying a respective named entity in each of the plurality of first candidate sentences, determining a standard expression corresponding to the identified respective named entity using phonemes of the corresponding named entity, determining whether to replace the identified named entity in each of the plurality of first candidate sentences with the determined standard expression based on a similarity between the named entity and the standard expression corresponding to the named entity and determining a plurality of second candidate sentences based on the determination result; and outputting a final sentence selected from the plurality of second candidate sentences.

The determining of the standard expression may include determining a standard expression corresponding to each respective named entity identified in the identifying of the named entity based on an inverted index search performed using phonemes included in the corresponding named entity.

The determining of the standard expression may include selecting a most similar standard expression from a plurality of standard expressions based on a number of included phonemes of the corresponding named entity, and a determined level of importance of the included phonemes, based on an inverted index table of the plurality of standard expressions.

The inverted index table may be a table obtained by indexing the plurality of standard expressions based on a phoneme-based inverted indexing scheme.

The plurality of standard expressions may include an expression previously designated by the user.

The outputting of the final sentence may include outputting a sentence among the second candidate sentences that is determined to most accurately correspond to the speech signal of the user as the final sentence based on a language model trained based on the standard expression.

The determining of the standard expression may include determining a domain of the speech signal based on an analysis of the speech signal, and determining the standard expression corresponding to each named entity from a plurality of standard expressions corresponding to the determined domain.

The domain of the speech signal may include at least one of contacts, an application, a music title, and a music artist respectively stored in a device of the user, and/or at least one of contacts, applications, a music title, and a music title respectively stored in another device.

The determining of the corresponding standard expression may include determining k corresponding standard expressions from a plurality of standard expressions in a similarity order based on a number of included phonemes of each named entity as identified in the identifying of the named entity, and a level of importance of the included phonemes, determining whether a similarity between the corresponding respectively named entity and each of the k corresponding standard expressions is greater than or equal to a threshold, and selecting j most similar standard expressions from the standard expressions having similarities determined greater than or equal to the threshold, where k is a natural number, and, j is a natural number between 1 and k.

In each of the plurality of first candidate sentences, one or both of the named entity and a domain of the named entity may be identified based on a determined type of the corresponding first candidate sentence.

The generating of the plurality of first candidate sentences may include generating N first candidate sentences that have highest recognition rates based on the speech recognition of the speech signal of the user, where N is a natural number greater than or equal to 2.

The outputting of the final sentence may include controlling an operation of a device of the user based on the outputted final sentence.

The standard expression may be represented in a one of a same language and a different language when compared to a language in which the plurality of first candidate sentences is represented.

The similarity may be a phoneme-based similarity between each named entity and a corresponding standard expression.

The method may include capturing the speech signal at a user device.

In a general aspect, a processing apparatus includes one or more processors configured to perform speech recognition of a speech signal, generate a plurality of first candidate sentences as a result of the performed speech recognition, identify a respective named entity in each of the plurality of first candidate sentences, determine a standard expression corresponding to the identified named entity using phonemes of the corresponding named entity, determining whether to replace the identified named entity in each of the plurality of first candidate sentences with the determined standard expression based on a similarity between the named entity and the standard expression corresponding to the named entity and determine a plurality of second candidate sentences based on the determination result; and output a final sentence selected from the plurality of second candidate sentences.

The one or more processors may be configured to determine a standard expression corresponding to each respective named entity identified in the identifying of the named entity based on an inverted index search performed using phonemes included in the corresponding named entity.

The one or more processors may be configured to output a sentence among the second candidate sentences that is determined to most accurately correspond to the speech signal of the user as the final sentence based on a language model trained based on the standard expression.

The one or more processors may be configured to determine a domain of the speech signal based on an analysis of the speech signal, and determine the standard expression corresponding to each named entity from a plurality of standard expressions corresponding to the determined domain.

The one or more processors may be configured to determine k corresponding standard expressions from a plurality of standard expressions in a similarity order based on a number of included phonemes of each named entity as identified in the identifying of the named entity, and a level of importance of the included phonemes, determine whether a similarity between the corresponding respectively named entity and each of the k corresponding standard expressions is greater than or equal to a threshold, and select j most similar standard expressions from the standard expressions having similarities determined greater than or equal to the threshold, where k is a natural number, and, j is a natural number between 1 and k.

The apparatus may be any one of a smart phone, a smart speaker, and an autonomous vehicle, and further includes a communication interface that includes a microphone.

The apparatus may further include a communication interface configured to receive a speech signal of a user.

In a general aspect, a processor-implemented method includes generating a plurality of candidate sentences as a result of performed speech recognition of a speech signal, identifying a named entity in each of the plurality of candidate sentences, determining a standard expression corresponding to the identified named entity using phonemes of the corresponding named entity; and selectively maintaining the named entity in a final outputted sentence, corresponding to one of the candidate sentences, based on a determined similarity between the named entity and the standard expression corresponding to the named entity.

In a general aspect, a speech processing apparatus includes one or more processors configured to acquire a speech signal of a user, generate a plurality of candidate sentences as a result of performed speech recognition of the received speech signal, identify a named entity in each of the plurality of first candidate sentences, determine a standard expression corresponding to the identified named entity using phonemes of the corresponding named entity; and selectively maintain the named entity in a final outputted sentence, corresponding to one of the candidate sentences, based on a determined similarity between the named entity and the standard expression corresponding to the named entity.

In a general aspect, a processor-implemented method includes performing a speech recognition operation on a speech signal, generating one or more first candidate sentences as a result of the performed speech recognition, determining one or more named entities from the one or more recognized first candidate sentences, determining a standard expression corresponding to each of the one or more named entity, determining a similarity between each of the one or more named entities and the standard expression, generating a plurality of second candidate sentences by changing at least one of the named entities to the standard expression, or by maintaining each of the named entities based on the determined similarity, determining a final sentence from the plurality of second candidate sentences based on a language model, and outputting the determined final sentence.

The similarity between each of the named entities and the standard expression may be determined based on phonemes.

Other features and aspects will be apparent from the following detailed description, the drawings, and the claims.

BRIEF DESCRIPTION OF DRAWINGS

FIG. 3 illustrates an example of an inverted index, in accordance with one or more embodiments.

Figure 1:
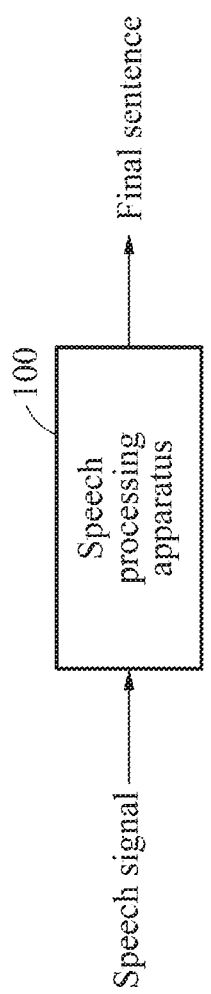
FIG. 1 illustrates an example speech processing apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of the application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing various examples only, and is not to be limiting of the examples. The articles "a," "an," and "the" are intended to include the plural forms as well, unless the context clearly indicates otherwise. It will be further understood that the terms "comprises/comprising" and/or "includes/including," when used herein, specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 2:
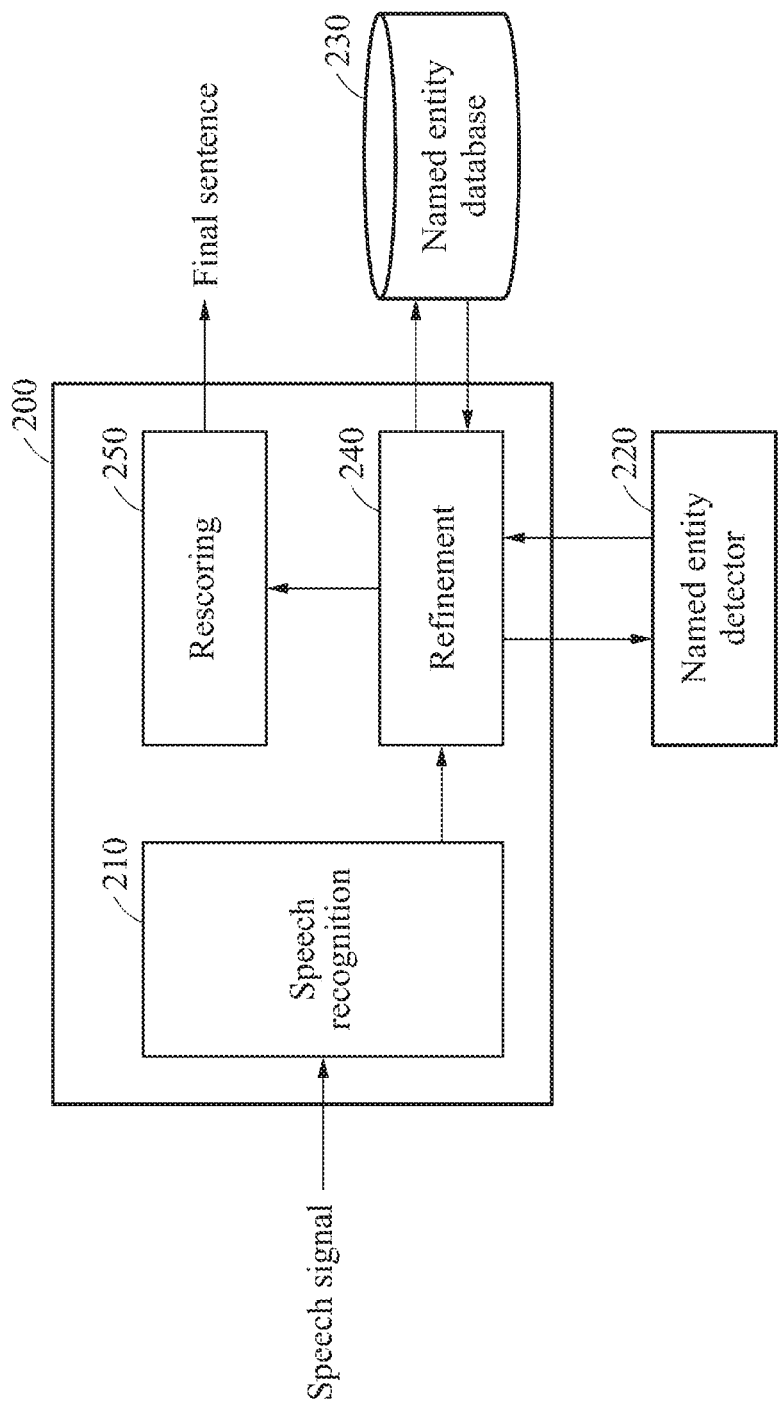
FIG. 2 illustrates an example speech processing apparatus, in accordance with one or more embodiments.

FIGS. 1 and 2 illustrate example speech processing apparatuses, in accordance with one or more embodiments.

FIG. 1 illustrates an example of a speech processing apparatus 100. The speech processing apparatus 100 is an apparatus that processes a speech signal of a user. The speech processing apparatus 100 may recognize an input speech signal and determine a sentence corresponding to the speech signal. For example, the user may utter "call ooo" to speak with a friend whose contact number is stored in a device. In a non-limiting example, "ooo" may be a named entity included in a recognized sentence or speech utterance, and may refer to a name of the friend whose contact is stored in a user terminal. Thus, the named entity is desirably recognized accurately. In another non-limiting example, "ooo" may be a phone number or other indicia that identifies a particular individual. The speech recognition is performed using a speech recognition model, so a named entity in a sentence obtained as the speech recognition result may be different from a stored expression due to a limited amount of learning data used to train the speech recognition model, e.g., independent of such stored expressions, and due to elements such as ambient noise of the speech signal.

Here, the stored expression or entity may be an expression or entity that is stored in, for example, the contacts folder of a user terminal, and may be determined by the user in advance. Thus, by replacing the named entity included in the recognized sentence or speech utterance with the typical expression, a final sentence to which a user intention is correctly reflected may be determined. Also, an operation that is based on the final sentence or speech utterance may be performed subsequently. Additionally, the speech processing apparatus 100 may be applied to, as non-limiting examples, machine translation, machine interpretation, and a chatbot system as well as the speech recognition according to one or more embodiments.

In one example, the speech processing apparatus 100 may be implemented as a separate apparatus, for example, a remote server, that is different and separate from a user terminal that is controlled by a user. As an example, communication between the speech processing apparatus 100 and the user terminal may be performed through a wired and/or wireless network. The speech signal of the user may be captured or received at the user terminal, and transmitted from the user terminal to the speech processing apparatus 100 through a wired and/or wireless network. The final sentence determined in the speech processing apparatus 100 may then be transmitted to the user terminal.

In a non-limiting example, the user may provide a voice command to interact with content displayed on the user device. A microphone of the user device may capture audio signals corresponding to the voice command, and may generate the corresponding speech signal. In an example, the speech data may be sent to the remote server, which may perform speech recognition on the speech signal. Alternately, the speech recognition may be performed on the user device. The remote server, or the user device, may utilize natural language processing techniques based on the speech signal according to one or more examples discussed herein, to determine one or more intents that correspond to the voice command. The remote server, or the user device, may perform the named entity recognition to identify portions of the speech data that correspond to a named entity that may be recognizable by the remote server or the user device according to one or more examples discussed herein.

Additionally, an operation based on the final sentence may be performed in the user terminal according to one or more examples discussed herein. The user terminal may include, as non-limiting examples, various computing devices such as a smartphone, a personal computer (PC), a tablet PC, and a laptop computer, various wearable devices such as a smartwatch and a smart glass, various home appliances such as a smart speaker, a smart TV, and a smart refrigerator, a smart car, a smart kiosk, autonomous vehicles, robots, and an Internet of Things (IoT) device. Examples include an artificial intelligence (AI) assistant that controls the user terminal in response to a voice command of the user may be implemented through the speech processing apparatus 100.

In a non-limiting example, the speech processing apparatus 100 and the user terminal may be implemented as a single device, so that the speech processing apparatus 100 may determine a final sentence by directly collecting the speech signal of the user and performing an operation thereof. The speech signal may be a speech sequence including a single sentence, a speech sequence including a plurality of sentences, or the sentence may be a phrase. Here, the use of the term "may" with respect to an example or embodiment, e.g., as to what an example or embodiment may include or implement, means that at least one example or embodiment exists where such a feature is included or implemented while all examples and embodiments are not limited thereto.

Referring to FIG. 2, a speech processing apparatus 200 may perform a speech recognition process 210 on a captured or received speech signal. The speech recognition process 210 may be performed using a speech recognition model in an encoder-decoder structure, for example.

The speech recognition model is a neural network including a plurality of layers. The neural network may be a deep neural network (DNN), as a non-limiting example. The DNN may include a plurality of layers. For example, the deep neural network may include an input layer to which input data is applied, an output layer for outputting a result derived through prediction based on training and the input data, and a plurality of hidden layers for performing a neural network operation between the input layer and the output layer. In such an example, the DNN may be one or more of a fully connected network, a convolution neural network, a recurrent neural network, and the like, or may include different or overlapping neural network portions respectively with such full, convolutional, or recurrent connections, according to an algorithm used to process information. The neural network may be configured to perform, as non-limiting examples, speech recognition and voice recognition by mutually mapping input speech or voice data and output speech or voice data, e.g., in a nonlinear relationship based on deep learning. Such deep learning is indicative of processor implemented machine learning schemes for solving issues, such as issues related to automated image or speech recognition from a data set, as non-limiting examples.

The neural network may include the encoder and the decoder. The encoder may determine the context information based on a feature vector extracted from a given speech signal. The context information may be, for example, a vector sequence which is summary information containing a meaning of a speech signal and the like. The decoder may generate a plurality of sentences corresponding to a speech recognition result based on the context information. For example, the decoder may generate, e.g., as final results of the speech recognition, N sentences having highest recognition rates of a speech signal based on an N-best technique, N being a natural number greater than or equal to 2. For convenience of explanation, the N sentences resulting from the speech recognition will be hereinafter merely referred to as "first candidate" sentences.

The speech processing apparatus 200 may perform the following example operations for each of the plurality of first candidate sentences. The speech processing apparatus 200 may be, as non-limiting examples, a user device (for example, a smartphone, a PC, a laptop, and/or an autonomous vehicle) or may alternately be a server. The speech processing apparatus 200 may identify a named entity for each of the first candidate sentences using a named entity detector 220. For example, the speech processing apparatus 200 may identify a named entity based on a determined sentence type. The speech processing apparatus 200 may retrieve a standard expression corresponding to the identified named entity from a named entity database 230. The named entity database 230 may include an inverted index table for a plurality of standard expressions, so that a most similar standard (or predetermined) expression is retrieved based on a number of included phonemes included in the identified named entity and a level of importance of the included phonemes.

The speech processing apparatus may replace a named entity in each first candidate sentence with a standard expression corresponding to the named entity in the first candidate sentence, or may maintain the named entity based on a similarity between the named entity in the first candidate sentence and the corresponding standard expression, thereby performing a refinement 240 to determine a second candidate sentence corresponding to each first candidate sentence. The similarity between the named entity in the first candidate sentence and the corresponding standard expression may be determined based on a phoneme. By performing the aforementioned operations for each of the plurality of first candidate sentences, a plurality of second candidate sentences may be determined.

The speech processing apparatus 200 may select a final sentence from the plurality of second candidate sentences by performing a rescoring process 250. The rescoring process 250 may be performed using a language model that is trained based on standard expressions. Through the rescoring process 250, a most natural first candidate sentence that most accurately reflects content uttered by the user may be selected as the final sentence from the plurality of second candidate sentences. The language model may be implemented by the speech processing apparatus 200 by, for example, one or more processors of the speech processing apparatus 200 that stores the language model in memory of the speech processing apparatus 200, along with all or some related database information, as non-limiting examples. For example, a memory of the speech processing apparatus 200 may store instructions, which when executed by the one or more processors configure the one or more processors to implement the language model and one or more or all operations described herein.

As such, the final sentence may be determined by performing the rescoring 250 process on the plurality of second candidate sentences determined by replacing the named entity in each first candidate sentence with the corresponding standard expression, or maintaining the named entity based on a similarity between the named entity and the corresponding standard expression. Additionally, by considering a fact that a quality of a second candidate sentence acquired through the refinement 240 may be changed based on an N-best decoding result, a probability of selecting a better final sentence may be maximized.

FIG. 3 illustrates an example of an inverted index, in accordance with one or more embodiments.

FIG. 3 illustrates an example of a grapheme-to-phoneme (G2P) conversion process 310 and an inverted index table 320. With respect to phonetic features, a domain-specific phonetic model may be applied to extract the features. Specifically, a double metaphone or a G2P model or algorithm may be applied to extract the phonetic features. The G2P model is a neural machine translation model that converts a group of input characters into phonemes (phonetic units). Specifically, the G2P model may be a sequence to sequence deep learning model.

The inverted index table 320 used for retrieving a standard expression corresponding to a named entity may be determined. Specifically, a plurality of standard expressions may be collected.

The plurality of standard expressions may be predetermined refined names, and may include, for example, a personalized name designated by a user and/or a widely used general name. The personalized name may include various names designated by the user, for example, a given or birth name, a byname, a nickname, and the like and stored in the contacts folder of a user terminal, and a given or birth name, a byname, a nickname, or a determined name of another device (e.g., smart home appliances, IoT devices, etc.) registered for the user. The general name may include various generic names designated by a manufacturer, a developer, and an artist other than the user, for example, a name of an application installed in the user terminal, a music artist, and a music title. The plurality of standard or generic expressions may be collected before a standard expression corresponding to a named entity is retrieved. In some examples, the plurality of standard expressions may be updated periodically or in response to the occurrence of a predetermined event.

Each standard expression may be converted into one or more phonemes based on the G2P conversion. For example, a standard expression "John Lennon" may be converted into phonemes "c0 oo ll rr ee nn oo nf", and a standard expression "Colleen McCauley" is converted into phonemes "kh oo ll rr ii nf mm qq kh oo ll rr ii."

Additionally, the inverted index table 320 may be determined using the phonemes acquired through the G2P conversion as keys and using the corresponding standard expression as a value. For example, each of the phonemes "c0 oo ll rr ee nn oo nf" of the standard expression "John Lennon" is a key, and the standard expression "John Lennon" is a value corresponding to the key. Similarly, each of the phonemes "kh oo ll rr ii nf mm qq kh oo ll rr ii" of the standard expression "Colleen McCauley" is a key, and the standard expression "Colleen McCauley" is a value corresponding to the key. When the determined inverted index table 320 is searched using the phoneme "c0" as a keyword, all standard expressions including the phoneme "c0", for example, the standard expression "John Lennon" may be retrieved. Additionally, when the determined inverted index table 320 is searched using the phoneme "oo" as a keyword, all standard expressions including the phoneme "oo", for example, the standard expressions "John Lennon" and "Colleen McCauley" may be retrieved.

When the speech processing apparatus selects, from the inverted index table 320, a standard expression corresponding to a named entity "John Lennon" identified in a first candidate sentence, the named entity "John Lennon" is converted into a plurality of phonemes "c0 oo ll rr ee nn oo nf" through a G2P conversion. Additionally, on the basis of an inverted index search performed using the plurality of phonemes "c0 oo ll rr ee nn oo nf" as a keyword, a most similar standard expression may be selected based on the included number of the phonemes and an importance of the included phonemes.

For example, in the inverted index search performed using the plurality of phonemes "c0 oo ll rr ee nn oo nf" as a keyword, "Colleen McCauley" is matched five times and "John Lennon" is matched eight times, which is the largest number of matchings, so that the standard expression "John Lennon" is selected.

As such, by indexing the plurality of standard expressions based on phonemes in advance, a high retrieval speed may be maintained even for a large number of searches having numerous named entities for searching.

Figure 4:
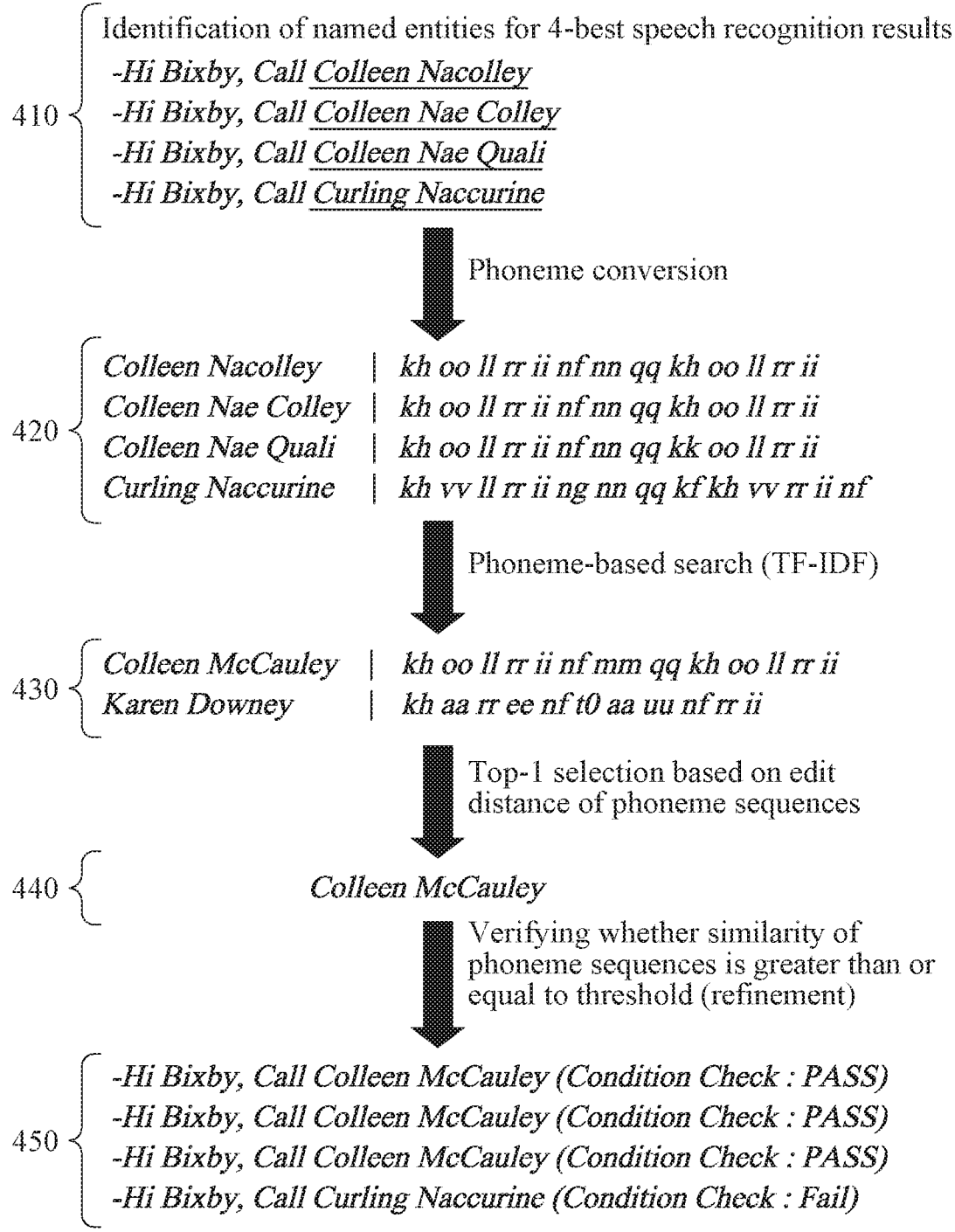
FIG. 4 illustrates an example process of determining candidate sentences, in accordance with one or more embodiments.
Figure 5:
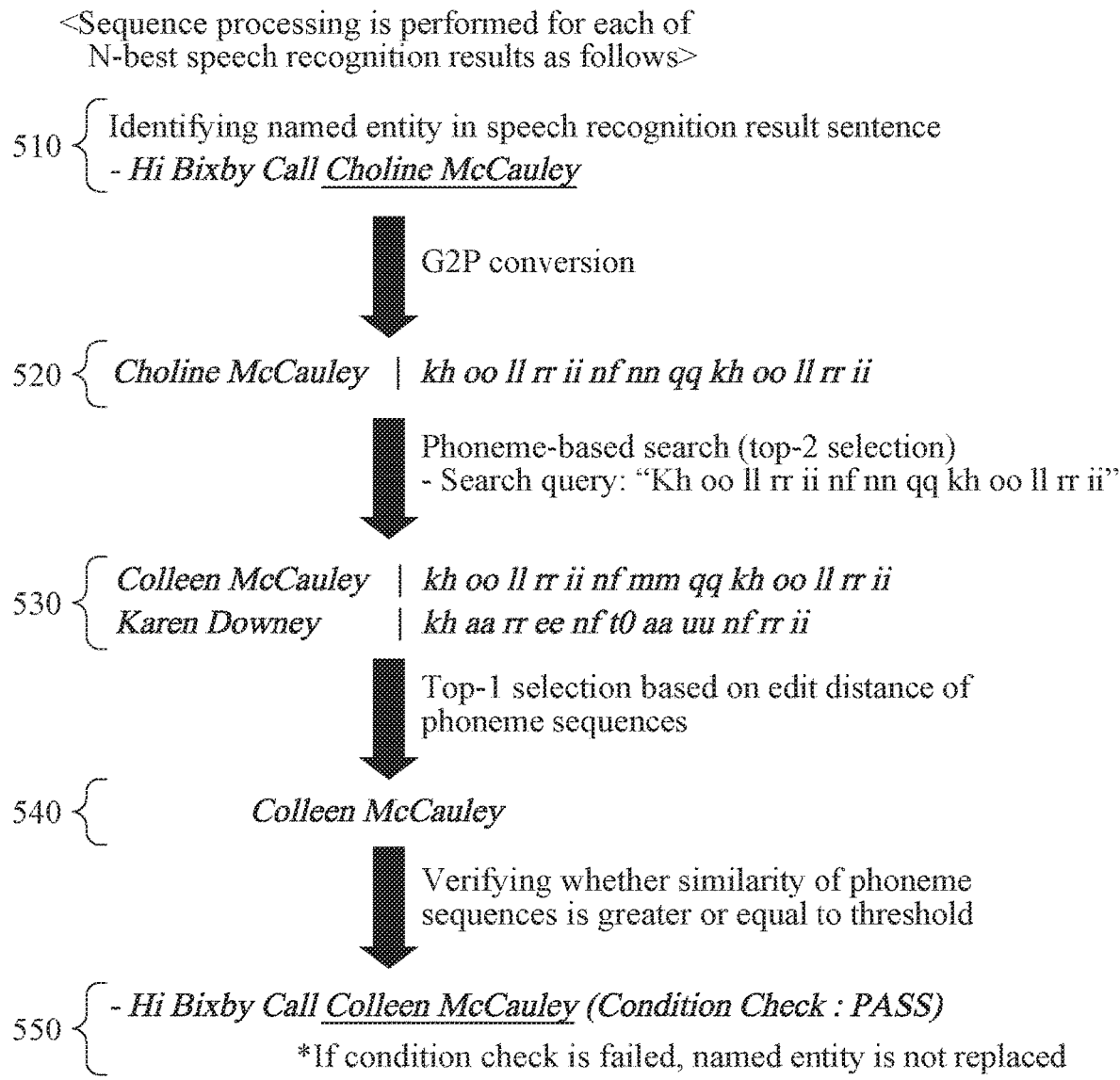
FIG. 5 illustrates an example process of determining candidate sentences, in accordance with one or more embodiments.

FIGS. 4 and 5 illustrate examples of a process of determining second candidate sentences, respectively in accordance with one or more embodiments.

Referring to FIG. 4, a plurality of second candidate sentences may be determined from a multilingual speech signal. In the example of FIG. 4, it is assumed that a user utters a speech signal including, for example, an English name in the Korean language.

In operation 410, four first candidate sentences having the highest recognition rates may be determined through a speech recognition of a speech signal. Since the user utters the speech signal in the Korean language, the entire speech signal including the English name may be recognized based on the Korean language. Since the English name is speech-recognized based on the Korean language, a recognition rate of the English name is relatively low as illustrated in FIG. 4. In some examples, spacing may also be incorrectly recognized.

A named entity is identified in each of the four first candidate sentences in operation 410. For ease of description, the identified named entity is underlined as shown in FIG. 4. In other words, "Colleen Nacolley", "Colleen Nae Colley", "Colleen Nae Quali", and "Curling Naccurine" are identified as named entities in the first candidate sentences.

In operation 420, the named entity is converted into a plurality of phonemes through the G2P conversion. For example, a named entity "Colleen Nacolley" is converted into phonemes "kh oo ll rr ii nf nn qq kh oo ll rr ii", a named entity "Colleen Nae Colley" is converted into phonemes "kh oo ll rr ii nf nn qq kh oo ll rr ii", a named entity "Colleen Nae Quali" is converted into phonemes "kh oo ll rr ii nf nn qq kk oo ll rr ii", and a named entity "Curling Naccurine" is converted into phonemes "kh vv ll rr ii ng nn qq kf kh vv rr ii nf".

In operation 430, a standard expression corresponding to each named entity is retrieved using phonemes of the corresponding named entity. An inverted index search using the phonemes included in the named entity as a keyword is performed, so that a standard expression corresponding to each named entity is retrieved. For example, an inverted index table of a plurality of standard expressions is used to obtain k standard expressions from the plurality of standard expressions in a similarity order based on a number of included phonemes of each named entity and an importance of the included phonemes, k being a natural number. In this example, a term frequency-inverse document frequency (TF-IDF)-based search is used. In "TF-IDF", TF denotes the number of phonemes of the corresponding named entity included in each standard expression and IDF denotes an importance of each of the phonemes.

In the example of FIG. 4, in operation 430, "Colleen McCauley" and "Karen Downey" are sequentially retrieved as two standard expressions corresponding to the four named entities. In some examples, a standard expression corresponding to each named entity and/or an order of standard expressions may vary. In the example of FIG. 4, for ease of description, it is assumed that a same search result is obtained for the four named entities.

In operation 440, from standard expressions corresponding to each named entity, one most similar standard expression to the corresponding named entity may be selected. For the selection, a phoneme-based similarity between a named entity and a standard expression is determined. The similarity may be determined based on an edit distance of phoneme sequences for each of the named entities and the standard expression. As the edit distance of the phoneme sequences decreases, a higher similarity may be determined.

In an example of the named entity "Colleen Nacolley", a first similarity between the named entity "Colleen Nacolley" and the standard expression "Colleen McCauley" is determined based on an edit distance between a phoneme sequence of "Colleen Nacolley" and a phoneme sequence of "Colleen McCauley." Additionally, a second similarity between the named entity "Colleen Nacolley" and the standard expression "Karen Downey" is determined based on an edit distance between a phoneme sequence of "Colleen Nacolley" and a phoneme sequence of "Karen Downey". The first similarity is greater than the second similarity. The standard expression "Colleen McCauley" is selected as a standard expression corresponding to the named entity "Colleen Nacolley." Likewise, the aforementioned operation may be performed on the remaining first candidate sentences.

In operation 450, a determination is made whether a similarity between each named entity and a corresponding standard expression is greater than, or equal to, a threshold. When the similarity is greater than or equal to the threshold, for example, when a condition check has passed, the named entity is changed to a corresponding standard expression in a corresponding first candidate sentence. Conversely, when the similarity is less than the threshold, for example, when the condition check has failed, the named entity is maintained in the first candidate sentence without replacement with the corresponding standard expression.

Through such refinement, four second candidate sentences may be determined. A language model-based rescoring may be performed on the four second candidate sentences. Through the rescoring process, one final sentence may be determined, and then output as a final speech recognition result.

Accordingly, by converting a named entity included in each first candidate sentence into phonemes through a G2P conversion process, retrieving a corresponding standard expression from an inverted index table using the phonemes of the named entity, determining a similarity between the retrieved standard expression and the named entity based on phonemes, and determining whether to replace the named entity with the standard expression, a speech recognition robust to a spacing error and a multilingual recognition error, which may occur in the speech recognition, may be achieved.

Referring to FIG. 5, a plurality of second candidate sentences may be determined from a monolingual speech signal. In the example of FIG. 5, it is assumed that a user utters a speech signal including an English name in the English language.

In operation 510, N first candidate sentences having the highest recognition rates may be determined based on speech recognition of a speech signal. Although FIG. 5 illustrates one of the N first candidate sentences for ease of description, the following description is also applicable to the remaining first candidate sentences.

A named entity may be identified in a speech-recognized first candidate sentence. For ease of description, the identified named entity is underlined as illustrated in FIG. 5. For example, "Choline McCauley" is identified in the corresponding first candidate sentence.

In operation 520, the identified named entity is converted into a plurality of phonemes through a G2P conversion. In an example, the named entity "Choline McCauley" is converted into phonemes "kh oo ll rr ii of nn qq kh oo ll rr ii."

In operation 530, a standard expression corresponding to the named entity may be retrieved using the phonemes of the named entity. An inverted index search may be performed using the phonemes included in the named entity as a keyword or search query. As a result, among a plurality of standard expressions, k standard expressions are obtained in a similarity order based on a number of included phonemes of the named entity and an importance of the included phonemes. In the example of FIG. 5, two standard expressions corresponding to the named entity "Choline McCauley" are retrieved in an order of "Colleen McCauley" and "Karen Downey".

In operation 540, from standard expressions corresponding to the named entity, a standard expression that is most similar to the named entity may be selected. The selecting may be performed based on a phoneme-based similarity between the named entity and the standard expression. The similarity may be determined based on an edit distance of phoneme sequences for the named entity and the standard expression.

In an example, based on an edit distance between a phoneme sequence of the named entity "Choline McCauley" and a phoneme sequence of the standard expression "Colleen McCauley", a first similarity therebetween is determined. Additionally, based on an edit distance between a phoneme sequence of the named entity "Choline McCauley" and a phoneme sequence of the standard expression "Karen Downey", a second similarity 2 therebetween is determined. The first similarity may be determined to be greater than the second similarity. The standard expression "Colleen McCauley" is then selected as a standard expression corresponding to the named entity "Choline McCauley."

In operation 550, a condition check is performed based on whether a similarity between the named entity and the selected standard expression is greater than, or equal to, a threshold. When the similarity is greater than, or equal to, the threshold, the named entity is changed to the selected standard expression in the first candidate sentence. Conversely, when the similarity is less than the threshold, the named entity is maintained in the first candidate sentence without replacement with the selected standard expression. Through such refinement, a second candidate sentence may be determined.

The aforementioned operations are performed for each of the N first candidate sentences obtained through the speech recognition, so that N second candidate sentences are determined. Among them, one final first candidate sentence is determined through a language model-based rescoring, and then output as a final speech recognition result.

Figure 6:
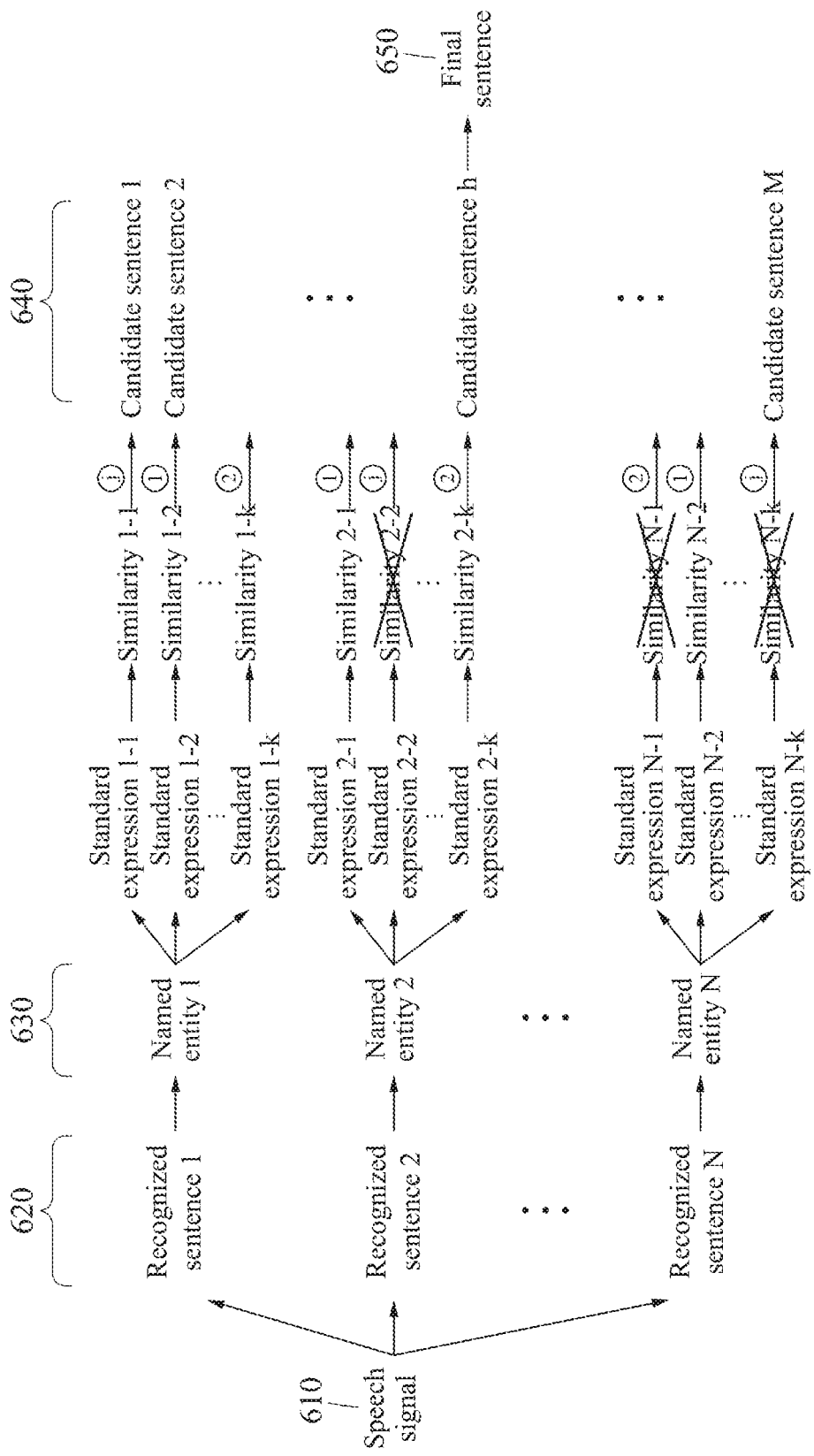
FIG. 6 illustrates an example process determining a plurality of standard expressions corresponding to each named entity, in accordance with one or more embodiments.

FIG. 6 illustrates an example of a plurality of standard expressions corresponding to each named entity, in accordance with one or more embodiments.

FIG. 6 illustrates an example of a process of determining a sentence among M second candidate sentences 640 determined from a speech signal 610 of a user, to be a final sentence 650.

N recognized first candidate sentences 620 are determined by performing a speech recognition on the speech signal 610 of the user. Additionally, N named entities 630 are determined by identifying a named entity in each of the N recognized first candidate sentences 620. The following operation will be described for each named entity for brevity.

In an example of a named entity 1, k standard expressions corresponding to the named entity 1 may be retrieved. A similarity between the named entity 1 and each of the k standard expressions is determined. A determination is made whether the determined similarity is greater than, or equal to, a threshold. From the standard expressions of which the determined similarity is greater than or equal to the threshold, j standard expressions are selected in a descending order of similarities, where j is a natural number between 1 and k. In the example of FIG. 6, since similarities 1-1 through a 1-k are greater than or equal to the threshold, the j standard expressions are selected from the standard expressions 1-1 through 1-k in the descending order of similarities. In FIG. 6, the descending order of similarities is represented by numbers in circles. The named entity is replaced with each of the j standard expressions, so that j second candidate sentences are generated in operation 640.

In an example of a named entity 2, k standard expressions corresponding to the named entity 2 are retrieved. A similarity between the named entity 2 and each of the k standard expressions is determined. A determination is then made whether the determined similarity is greater than, or equal to, a threshold. In FIG. 6, a similarity less than the threshold is represented by an "X" mark. From standard expressions having similarities greater than or equal to the threshold, j standard expressions are selected in a descending order of similarities. When a number of the standard expressions having similarities greater than or equal to the threshold is less than j, a standard expression having a similarity less than the threshold, for example, a standard expression 2-2 may be selected. In this example, since the similarity of the standard expression 2-2 is less than the threshold, a second candidate sentence including the named entity 2 is determined without replacement with the standard expression 2-2.

The aforementioned operation may then be performed for the remaining entities, so that the M second candidate sentences 640 is determined. M is determined according to "N×j". Through a language model-based rescoring, one of the M second candidate sentences 640 is selected as the final sentence 650 to be output.

Figure 7:
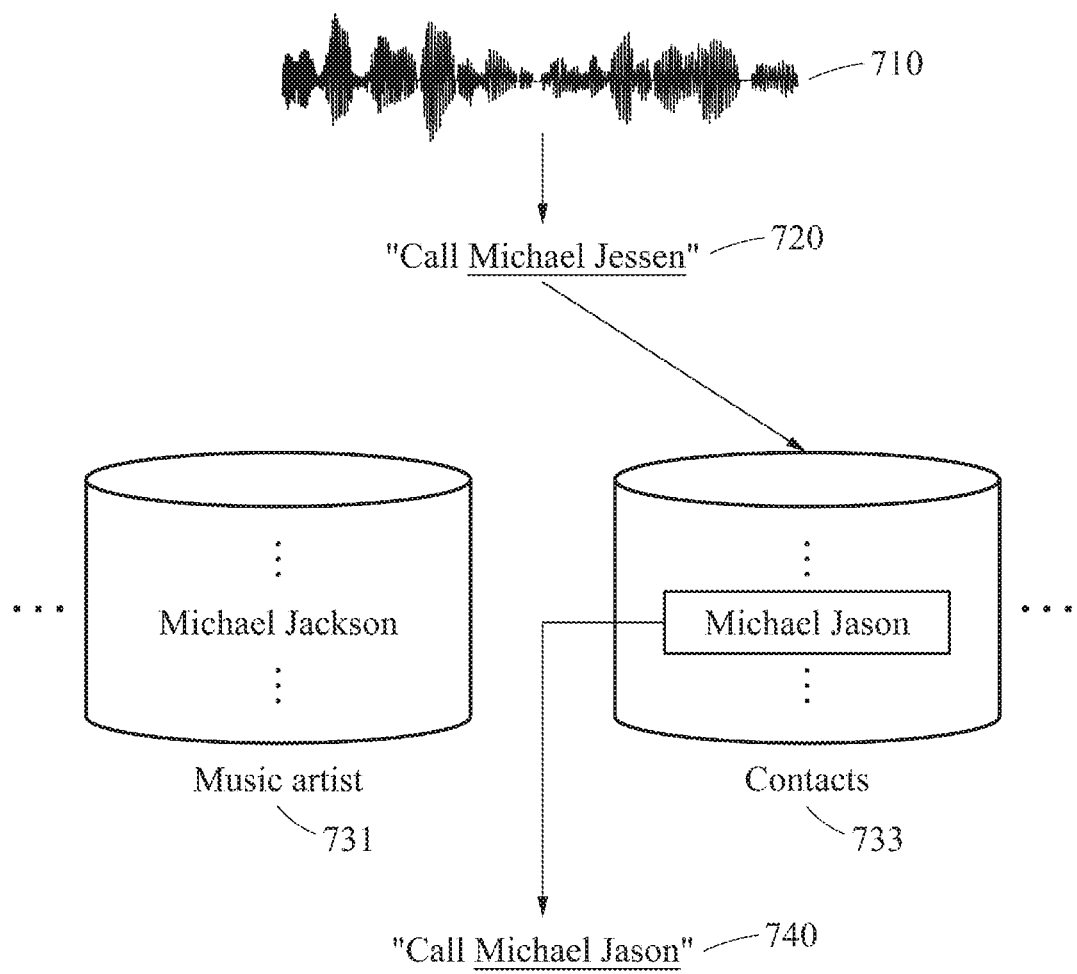
FIG. 7 illustrates an example determining of a standard expression based on a domain of a speech signal, in accordance with one or more embodiments.

FIG. 7 illustrates an example of determining a standard expression based on a domain of a speech signal, in accordance with one or more embodiments.

Referring to FIG. 7, a plurality of standard expressions may be classified based on a domain. The domain refers to an area to which a specific standard expression belongs and includes, for example, contacts stored in a user terminal, an application, another device (e.g., a smart appliance, an IoT device, etc.) related to a user, a music title, and a music artist. The above-described inverted index table is generated separate for each domain. For example, an inverted index table of a contacts domain is determined based on a plurality of standard expressions corresponding to contacts stored in a user terminal, and an inverted index table of a music artist domain is determined based on a plurality of standard expressions corresponding to a music artist. As such, the inverted index table is generated based on a number of domains.

In the example of FIG. 7, "Michael Jessen" is identified as a named entity in an uttered first candidate sentence 720 corresponding to a speech recognition result of a speech signal 710. A standard expression corresponding to the named entity "Michael Jessen" may then be retrieved. In this example, a search is performed on the plurality of standard expressions belonging to a domain of the speech signal 710. The speech signal 710 may be, for example, a telephone call made by a user to an acquaintance of which a contact number is stored in a user terminal of the user. Based on the speech signal 710, a domain is determined to be the contacts domain. Therefore, a search is performed on a plurality of standard expressions in a contacts domain 733 to obtain a standard expression corresponding to the named entity "Michael Jessen." As a result, a most similar standard expression "Michael Jason" to the named entity "Michael Jessen" is retrieved. When a similarity between the named entity "Michael Jessen" and the standard expression "Michael Jason" is greater than, or equal to, a threshold, a second candidate sentence 740, obtained by replacing the named entity "Michael Jessen" with the standard expression "Michael Jason" in the first sentence 720, is determined.

In an example, when the speech signal 710 is "play Michael Jessen music", a domain of the speech signal 710 is determined to be a music artist domain, so that a search is performed on a music artist domain 731 to obtain a standard expression corresponding to the named entity "Michael Jessen." As a result, a most similar standard expression "Michael Jackson" to the named entity "Michael Jessen" may be retrieved.

As such, by searching for a standard expression corresponding to a named entity retrieved from a speech signal 710 based on a determined domain, a speech recognition result with a high-level accuracy consistent with a user intention may be achieved.

Figure 8:
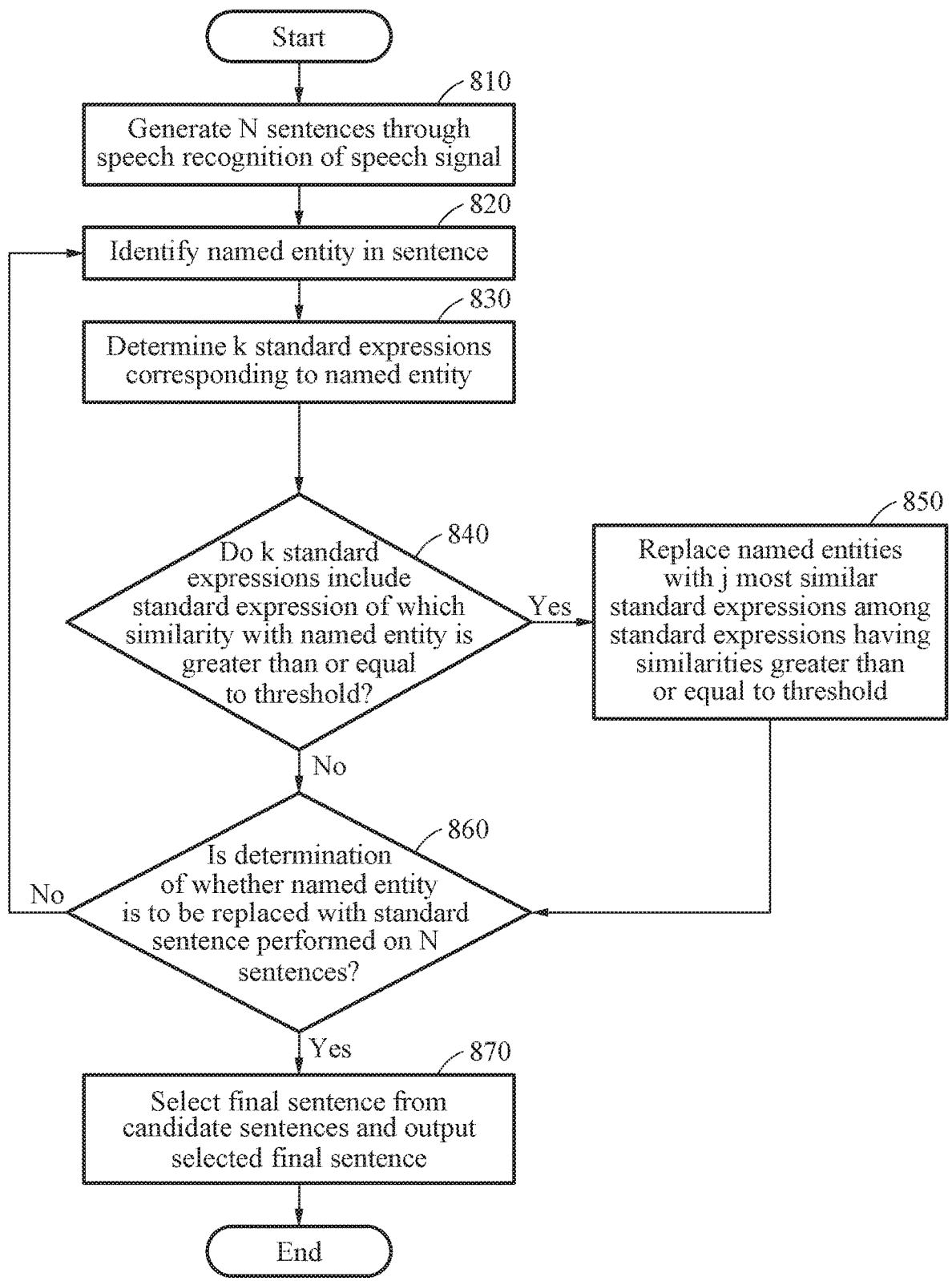
FIG. 8 is a flowchart illustrating an example operation of a speech processing apparatus, in accordance with one or more embodiments.

FIG. 8 is a flowchart illustrating an example of an operation of a speech processing apparatus, in accordance with one or more embodiments. The operations in FIG. 8 may be performed in the sequence and manner as shown. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, the following operations are performed in a processor included in a speech processing apparatus. In the examples, a "processor" may mean one or more processors, and a "memory" may mean one or more memories.

In operation 810, the speech processing apparatus generates N first candidate sentences by performing a speech recognition process on an inputted speech signal of a user, N being a natural number greater than, or equal to, 2. The speech processing apparatus may generate the N first candidate sentences by implementing an N-best technique and a speech recognition model of an encoder-decoder structure.

Operations 820 through 850 are performed for each of the N first candidate sentences and, for ease of description, each operation will be described based on a description of one first candidate sentence.

In operation 820, the speech processing apparatus identifies a named entity in a first candidate sentence. The named entity is an entity that is represented by a real name, and includes, as non-limiting examples, a name of a person, an application name, a music title, and a music artist. The speech processing apparatus identifies a named entity in a first candidate sentence based on a type of first candidate sentence. For example, when a type of a first candidate sentence is "call ○○○", the speech processing apparatus identifies "○○○" in the first candidate sentence as a named entity. Similarly, when the types of first candidate sentences are "play ΔΔΔ music" and "execute □□□ application", the speech processing apparatus identifies "ΔΔΔ" and "□□□"

in the first candidate sentences as named entities. Additionally, various first candidate sentence types may be applied without limitation.

In operation 830, the speech processing apparatus determines k standard expressions corresponding to the identified named entity among a plurality of standard expressions using phonemes of the named entity, where k is a natural number.

In operation 840, the speech processing apparatus determines whether the k standard expressions include a standard expression of which a similarity with the named entity is greater than, or equal to, a threshold. The similarity may be determined based on a phoneme-based edit distance. When the standard expression having the similarity greater than or equal to the threshold is present, operation 850 is performed. Conversely, when the standard expression having the similarity greater than or equal to the threshold is absent, second candidate sentences in which the named entity is maintained without replacement with a standard expression are determined, and then operation 860 is performed.

In operation 850, the speech processing apparatus determines j second candidate sentences by replacing corresponding named entities with j most similar standard expressions among standard expressions having similarities greater than or equal to the threshold, where j is a natural number between 1 and k. When a number of the standard expressions that have similarities greater than or equal to the threshold is less than j, a second candidate sentence in which the named entity is maintained without replacement with a standard expression may also be determined.

In operation 860, a verification process where the speech processing apparatus verifies whether a named entity is to be replaced with a standard first candidate sentence is performed on the N first candidate sentences generated as a speech recognition result. When the N first candidate sentences include a first candidate sentence on which the determination of whether a named entity is to be replaced with a standard first candidate sentence is not performed, operation 820 is performed on the corresponding first candidate sentence. When the N first candidate sentences do not include such a sentence, operation 870 is performed.

In operation 870, the speech processing apparatus may select one of M second candidate sentences as a final sentence and output the final sentence. When selecting the final sentence, a language model trained based on standard expressions may be used.

Since the description of FIGS. 1 through 7 applies to the aforementioned operations of FIG. 8, repeated description will be omitted.

Figure 9:
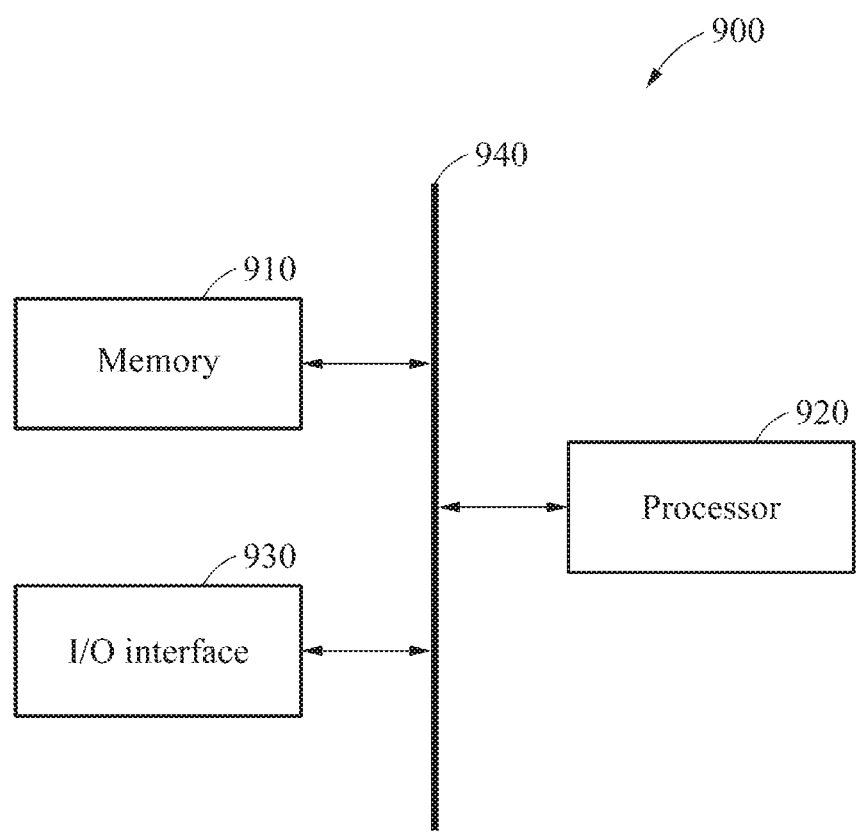
FIG. 9 illustrates an example speech processing apparatus, in accordance with one or more embodiments.

FIG. 9 illustrates an example of a speech processing apparatus.

Referring to FIG. 9, a speech processing apparatus 900 may include one or more memories 910, one or more processors 920, and an input and output (I/O) interface 930 configured to receive speech input data of a user. The one or more memories 910, the one or more processors 920, and the I/O interface 930 communicate through a bus 940. In the examples, reference to "a processor" may mean one or more processors, and reference to a "memory" may mean one or more memories.

In an example, the input/output interface 930 may be a display that receives an input from a user, or that provides an output. In an example, the input/output interface 930 may function as an input device, and may capture or receive an input from a user through an input method, for example, a voice input. Thus, the input/output interface 603 may include, as non-limiting examples, a microphone, and other devices that may detect an input from a user and transmit the detected input to the processor 920.

In an example, the speech recognition apparatus 900 may further store instructions, for example, in memory 910, which when executed by the processor 920 configure the processor 920 to implement such one or more or any combination of operations. In an example, the speech recognition apparatus 900 may be configured as hardware may include, as non-limiting examples, a microprocessor, a central processing unit, a processor core, a multi-core processor, a multiprocessor, an application-specific integrated circuit (ASIC), and a field programmable gate array (FPGA).

The memory 910 is a volatile memory or a non-volatile memory.

The processor 920 is a device for executing instructions or programs, or controlling the speech processing apparatus 900. The processor 920 includes, for example, a central processing unit (CPU) and graphics processing unit (GPU). The speech processing apparatus 900 may be connected to an external device, for example, a microphone and a keyboard, through the I/O interface 930, to receive an input first candidate sentence of a user or output a response first candidate sentence. In addition, the speech processing apparatus 900 may perform the operations described above.

Figure 10:
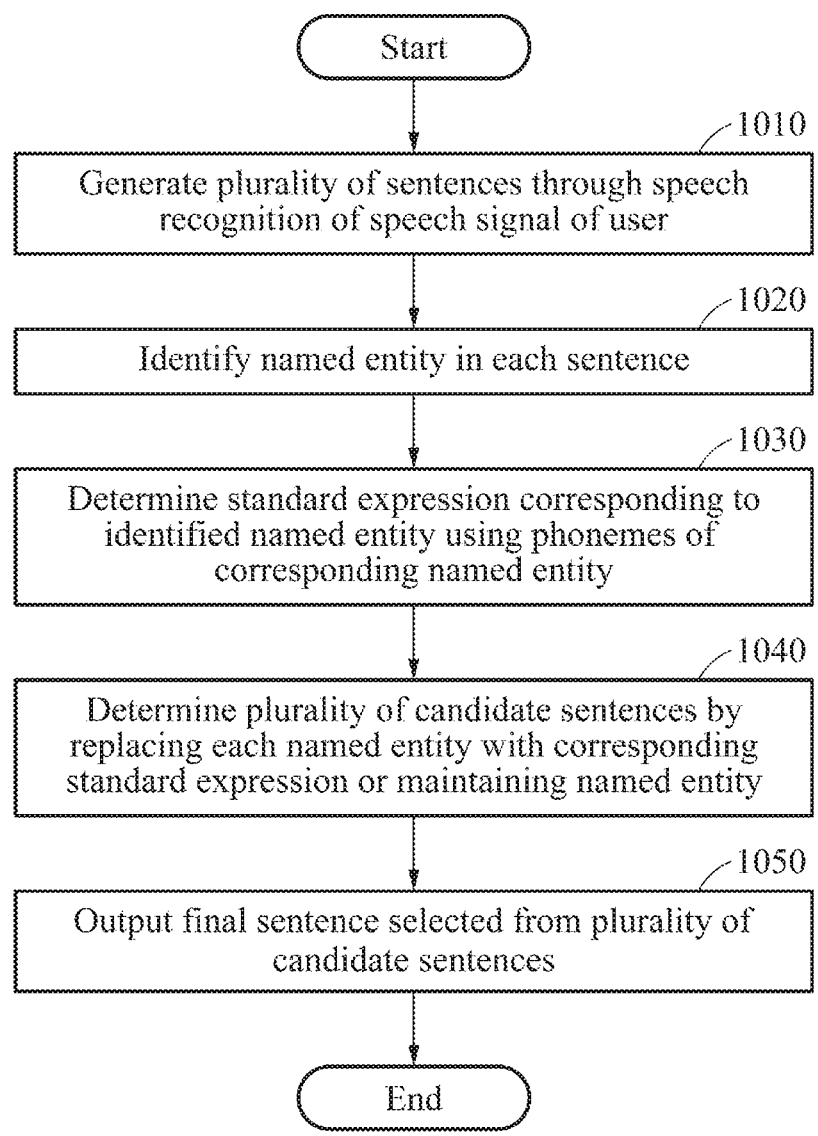
FIG. 10 illustrates an example speech processing method, in accordance with one or more embodiments.

FIG. 10 illustrates an example of a speech processing method, in accordance with one or more embodiments. The operations in FIG. 10 may be performed in the sequence and manner as shown. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Referring to FIG. 10, a speech processing method is performed in a processor included in a speech processing apparatus.

In operation 1010, the speech processing apparatus may generate a plurality of first candidate sentences in response to a speech recognition process being performed on a speech signal of a user. In operation 1020, the speech processing apparatus may identify a named entity in each of the plurality of first candidate sentences. In operation 1030, the speech processing apparatus may determine a standard expression corresponding to the identified named entity using phonemes of the corresponding named entity. In operation 1040, the speech processing apparatus may determine a plurality of second candidate sentences by replacing a named entity of each of the plurality of first candidate sentences with a standard expression corresponding to the named entity, or otherwise maintaining the named entity based on a determined similarity between the named entity and the standard expression corresponding to the named entity. In operation 1050, the speech processing apparatus may output a final sentence selected from the plurality of second candidate sentences.

Since the description of FIGS. 1 through 9 applies to the aforementioned operations of FIG. 10, repeated description will be omitted.

The neural network apparatuses, speech processing apparatus 100, corresponding processors, memories, and processor 920, memory 910, input/out interface 930, and other devices, and other components described herein are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-10, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this invention that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
executing computer readable code, stored in a non-transitory computer-readable storage medium, by a processor and configuring the processor, through the execution, to perform operations of:
performing, speech recognition of a speech signal by implementing a machine learning speech recognition model provided the speech signal of a user;
generating, as a result of the performing of the speech recognition, a plurality of first candidate sentences where each first candidate sentence corresponds to the speech signal;
identifying, a respective named entity in each of the plurality of first candidate sentences;
determining, based on an inverted index search performed using phonemes of each identified respective named entity in an inverted index table comprising included phonemes of each identified respective named entity, based on a number of included phonemes of each respective named entity and a determined level of importance of the included phonemes of each respective named entity, a standard expression corresponding to each identified respective named entity;
selecting, from among a plurality of the determined standard expression, a most similar standard expression;
determining, whether to replace the respective named entity in each of the plurality of first candidate sentences with the selected most similar standard expression based on a similarity between the respective named entity in each of the plurality of the first candidate sentence and the most similar standard expression;
determining, based on a result of the determining whether to replace the respective named entity in each of the plurality of the first candidate sentences with the most similar standard expression, a plurality of second candidate sentences; and
outputting, a final sentence selected from the plurality of second candidate sentences by implementing a machine learning language model provided the plurality of second candidate sentences,
wherein the inverted index search is a term frequency-inverse document frequency (TF-IDS)-based search.

2. The method of claim 1, wherein the inverted index table is a table obtained by indexing the plurality of standard expressions based on a phoneme-based inverted indexing scheme.

3. The method of claim 1, wherein the plurality of standard expressions comprises an expression previously designated by the user.

4. The method of claim 1, wherein the machine learning language model selects a sentence among the second candidate sentences that most accurately corresponds to the speech signal of the user as the final sentence based on a language model trained based on the standard expression.

5. The method of claim 1, wherein the determining of the standard expression comprises:

determining a domain of the speech signal based on an analysis of the speech signal; and
determining, for each of the respective named entities, the standard expression corresponding to the respective named entity from a plurality of standard expressions corresponding to the determined domain.

6. The method of claim 5, wherein the domain of the speech signal comprises at least one of contacts, an application, a music title, and a music artist respectively stored in a device of the user, and/or at least one of contacts, applications, a music title, and a music title respectively stored in another device.

7. The method of claim 1, wherein the determining of the corresponding standard expression comprises:
for each of the identified respective named entities,
determining k corresponding standard expressions from a plurality of standard expressions in a similarity order based on the number of included phonemes of the identified respective named entity, and the level of importance of the included phonemes,
determining whether a similarity between the identified respective named entity and each of the k corresponding standard expressions is greater than or equal to a threshold, and
selecting j most similar standard expressions from the standard expressions having similarities determined greater than or equal to the threshold,
where k is a natural number, and, j is a natural number between 1 and k.

8. The method of claim 1, wherein, in each of the plurality of first candidate sentences, one or both of the identified respective named entity and a domain of the respective named entity is identified based on a determined type of the corresponding first candidate sentence.

9. The method of claim 1, wherein the generating of the plurality of first candidate sentences comprises:
generating N first candidate sentences that have highest recognition rates based on the speech recognition of the speech signal of the user,
where N is a natural number greater than or equal to 2.

10. The method of claim 1, wherein the outputting of the final sentence comprises controlling an operation of a device of the user based on the outputted final sentence.

11. The method of claim 1, wherein the standard expression is represented in a one of a same language and a different language when compared to a language in which the plurality of first candidate sentences is represented.

12. The speech processing method of claim 1, wherein the similarity is a phoneme-based similarity between each identified respective named entity and a the most similar standard expression is based on an edit distance of phoneme sequences between each identified respective named entity and the most similar standard expression.

13. The method of claim 1, further comprising:
obtaining, before the determining of the standard expression corresponding to each identified respective named entity, phonemes of each identified respective name entity.

14. A non-transitory computer-readable storage medium storing the instructions that, when executed by a processor, cause the processor to perform the method of claim 1.

15. A speech processing apparatus comprising:
one or more processors configured to execute instructions; and
a memory storing the instructions, wherein the execution of the instructions by the one or more processors, configures the one or more processors to:

perform speech recognition of a speech signal by implementing a machine learning speech recognition model provided the speech signa of a user;
generate, as a result of the performed speech recognition, a plurality of first candidate sentences where each first candidate corresponds to the speech signal;
identify a respective named entity in each of the plurality of first candidate sentences;
determine, by performing an inverted index search using the phonemes of each identified respective named entity in an inverted index table comprising included phonemes of each respective named entity, based on a number of included phonemes of each respective named entity and a determined level of importance of the included phonemes of each respective named entity, a standard expression corresponding to each identified respective named entity;
select, from among a plurality of the determined standard expression, a most similar standard expression;
determine whether to replace the respective named entity in each of the plurality of first candidate sentences with the selected most similar standard expression based on a similarity between the respective named entity in each of the plurality of first candidate sentence and the most similar standard expression; and
determine, based on a result of the determining whether to replace the respective named entity in each of the plurality of first candidate sentences with the most similar standard expression, a plurality of second candidate sentences; and
output a final sentence selected from the plurality of second candidate sentences by implementing a machine learning language model provided the plurality of second candidate sentences to generate the final sentence,
wherein the inverted index search is a term frequency-inverse document frequency (TF-IDF)-based search.

16. The apparatus of claim 15, wherein the machine learning language model selects a sentence among the second candidate sentences that most accurately corresponds to the speech signal of the user as the final sentence based on a language model trained based on the standard expression.

17. The apparatus of claim 15, wherein the one or more processors are configured to determine a domain of the speech signal based on an analysis of the speech signal, and determine, for each of the respective named entities, the standard expression corresponding to the respective named entity from a plurality of standard expressions corresponding to the determined domain.

18. The apparatus of claim 15, wherein the one or more processors are configured to, for each of the respective named entities,
determine k corresponding standard expressions from a plurality of standard expressions in a similarity order based on the number of phonemes of the respective named entity, and the level of importance of the phonemes,
determine whether a similarity between the respective named entity and each of the k corresponding standard expressions is greater than or equal to a threshold, and
select j most similar standard expressions from the standard expressions having similarities determined greater than or equal to the threshold,
where k is a natural number, and, j is a natural number between 1 and k.

19. The method of claim 15, further comprising:
obtaining, before the determining of the standard expression corresponding to each identified respective named entity, phonemes of each identified respective name entity.

20. The apparatus of claim 15, wherein the similarity is a phoneme-based similarity between each identified respective named entity and the most similar standard expression is based on an edit distance of phoneme sequences between each identified respective named entity and the most similar standard expression.

\* \* \* \* \*